US012654403B2

(12) United States Patent
Labordus

(10) Patent No.: US 12,654,403 B2
(45) Date of Patent: Jun. 16, 2026

(54) METHOD AND DEVICE FOR ELECTROMAGNETIC SPOT WELDING OF MOULDED PARTS

(71) Applicant: KOK & VAN ENGELEN COMPOSITE STRUCTURES B.V., The Hague (NL)

(72) Inventor: Maarten Labordus, Delft (NL)

(73) Assignee: KOK & VAN ENGELEN COMPOSITE STRUCTURES B.V., The Hague (NL)

( * ) Notice: Subject to any disclaimer, the term of this patent is extended or adjusted under 35 U.S.C. 154(b) by 67 days.

(21) Appl. No.: 18/267,415

(22) PCT Filed: Dec. 7, 2021

(86) PCT No.: PCT/EP2021/084589
§ 371 (c)(1),
(2) Date: Jun. 14, 2023

(87) PCT Pub. No.: WO2022/128625
PCT Pub. Date: Jun. 23, 2022

(65) Prior Publication Data
US 2024/0059027 A1 Feb. 22, 2024

(30) Foreign Application Priority Data
Dec. 15, 2020 (NL) ...................................... 2027112

(51) Int. Cl.
*B29C 65/00* (2006.01)

(52) U.S. Cl.
CPC ........ *B29C 66/81821* (2013.01); *B29C 66/21* (2013.01); *B29C 66/81811* (2013.01); *B29C 66/863* (2013.01)

(58) Field of Classification Search
CPC .............. B29C 66/81821; B29C 66/21; B29C 66/81811; B29C 65/562; B29C 65/72
See application file for complete search history.

(56) References Cited

U.S. PATENT DOCUMENTS 4,602,139 A * 7/1986 Hutton .................... H05B 6/105
156/274.2
5,240,542 A * 8/1993 Miller ................. B29C 66/7212
156/272.4

(Continued)

FOREIGN PATENT DOCUMENTS

DE 102009056580 A1 * 5/2011 ......... B29C 65/7841
JP 2016055291 A 4/2016

(Continued)

OTHER PUBLICATIONS

International Preliminary Report on Patentability for the International Application No. PCT/EP2021084589, mailed Mar. 14, 2023, 35 pages.

(Continued)

*Primary Examiner* — Daniel Mcnally
(74) *Attorney, Agent, or Firm* — KDW Firm PLLC

(57) ABSTRACT

A device for electromagnetic spot welding of moulded parts includes a pressurizing body, first displacing means configured for moving a pressurizing surface of the pressurizing body against the moulded parts or vice versa to join contact surfaces of the moulded parts to be fused by welding under pressure, an inductor provided in the pressurizing body and configured to generate an electromagnetic field in at least the contact surfaces of the moulded parts, and a mechanical fastener configured to be heated by the electromagnetic field generated by the inductor, or by other means. Second displacing means are configured for moving the mechanical fastener towards the moulded parts and drive the heated mechanical fastener into the joined moulded parts to a (Continued)

position further than the contact surfaces of the moulded parts. A method for electromagnetic welding of moulded parts using the device.

17 Claims, 8 Drawing Sheets

(56)                    References Cited

U.S. PATENT DOCUMENTS

| | | | | |
|---|---|---|---|---|
| 5,414,247 | A | * | 5/1995 | Geithman ......... B29C 66/91931 |
| | | | | 219/667 |
| 5,438,181 | A | * | 8/1995 | Volkmann ......... B29C 66/81821 |
| | | | | 219/601 |
| 2011/0277906 | A1 | * | 11/2011 | Schmitt ............. B29C 66/92445 |
| | | | | 156/499 |
| 2014/0356053 | A1 | * | 12/2014 | Urayama ................ B29C 65/72 |
| | | | | 156/92 |
| 2015/0290914 | A1 | * | 10/2015 | Campbell ................ B21J 15/08 |
| | | | | 156/92 |
| 2016/0332214 | A1 | * | 11/2016 | Hornbostel ............ B21J 15/025 |

FOREIGN PATENT DOCUMENTS

| | | | | |
|---|---|---|---|---|
| JP | 2017185626 A | 10/2017 | | |
| WO | WO-2014196268 A1 | * | 12/2014 | ........... B21J 15/025 |
| WO | 2018163072 A1 | 9/2018 | | |
| WO | 2019231327 A1 | 12/2019 | | |

OTHER PUBLICATIONS

International Search Report and Written Opinion for the International Application No. PCT/EP2021/084589, mailed Mar. 31, 2022, 15 pages.

* cited by examiner

METHOD AND DEVICE FOR ELECTROMAGNETIC SPOT WELDING OF MOULDED PARTS

This application is a national stage filing under 35 U.S.C. 371 of pending International Application No. PCT/EP2021/084589, filed Dec. 7, 2021, which claims priority to Netherlands Patent Application No. 2027112, filed Dec. 15, 2020, the entirety of which applications are incorporated by reference herein.

TECHNICAL FIELD OF THE INVENTION

The invention relates to a method for electromagnetic spot welding of moulded parts, and to a device for electromagnetic spot welding. Spot welding in the context of the present application produces a discontinuous weld at one point of welding by providing a stationary inductor that, under alternating voltage, generates an electromagnetic field. This is in contrast with continuous welding in which the inductor is moved over moulded parts to be welded together along a trajectory of welding. Spot welding and continuous welding may not be compared. Heat generation in the moulded parts to be welded may be completely different for instance.

BACKGROUND OF THE INVENTION

A number of technologies exist for joining moulded parts, for instance fibre reinforced thermoplastic or thermosetting composite parts. Mechanical fastening and adhesive bonding are traditionally used to join two contact surfaces of the moulded parts. However, both mechanical fastening and adhesive bonding appear to be costly and time consuming. Mechanical fastening for instance requires expensive hole locating, drilling, shimming, and fastener installation, while adhesive bonding requires complicated surface pre-treatments that may involve chemical substances.

Electromagnetic welding may eliminate the use of separate fasteners and potentially offers the ability to join contact surfaces of moulded composite parts at relatively high speeds and little, if any, pre-treatments. Electromagnetic welding generates an electromagnetic field in an induction-sensitive component of one or more of the moulded part(s) to heat a heat meltable coupling means of the moulded part(s) to above a melting temperature of the coupling means. The contact surfaces of the moulded parts are joined to each other by the molten coupling means. The coupling means may for instance be a thermoplastic resin of one or more of the parts to be joined, or may be a separately applied thermoplastic resin. For welding thermoplastic and thermoset moulded parts together, the thermoplastic resin that the induction-sensitive component melts may function as a hot melt adhesive for instance.

A number of welding methods are available for creating a spot-welded connection between moulded parts such as fibre reinforced composite moulded parts. In resistance welding, a foreign material needs to be added to act as a welding element. For conduction welding, the composite parts or laminates are heated through and through resulting in a tool print in the surface, and ultrasonic welding requires a specific energy director material, and is very sensitive for geometrical tolerance and partial recrystallization, for instance. Known methods of electromagnetic spot welding may produce joined products of inferior quality, particularly in high-grade applications in which relatively high mechanical strength and load-bearing capacity of the welded connection is desired, such as in the aviation industry.

Another problem may be that (spot) welded connections may not provide enough strength in a direction perpendicular to a plane of the welded moulded parts. So-called out-of-plane loads tend to delaminate (parts of) the (spot) welded moulded parts.

SUMMARY OF THE INVENTION

It is an object of the invention to provide an improved method and device for spot welding of moulded parts. It is another aim of the invention to provide a method and device for spot welding of moulded parts that may produce welded moulded parts with an increased resistance against out-of-plane loads and delamination.

The invention provides for this purpose a device for electromagnetic spot welding of moulded parts in accordance with claim 1. The invented device comprises a pressurizing body;

first displacing means configured for moving a pressurizing surface of the pressurizing body against the moulded parts or vice versa to join contact surfaces of the moulded parts to be fused by welding under pressure;

an inductor provided in the pressurizing body and configured to generate an electromagnetic field in at least the contact surfaces of the moulded parts;

a mechanical fastener that is configured to be heated by the electromagnetic field generated by the inductor, or by other means, and second displacing means configured for moving the mechanical fastener towards the moulded parts and drive the heated mechanical fastener into the joined moulded parts to a position further than the contact surfaces of the moulded parts.

With the invented device, a spot weld may be effectively strengthened, in particular in an out-of-plane direction that extends at a non-zero angle with the contact surfaces. During welding, the mechanical fastener is heated by the electromagnetic field generated by the inductor, or by other means. The heated mechanical fastener is then moved by the second displacing means towards the heated moulded parts and driven into the joined and heated moulded parts to a position further than the contact surfaces of the moulded parts. After spot welding, simultaneously providing the mechanical fastener into the moulded parts, and cooling the mechanical fastener and moulded parts, a joined assembly is obtained that has an improved out-of-plane mechanical strength.

Since the mechanical fastener is driven into heated and therefore relatively soft moulded parts, reinforcing fibers in the moulded parts are deviated relatively easily and formed around a cavity, produced by the mechanical fastener. This provides a further advantage over for instance providing a mechanical fastener by boring a hole into solid moulded parts. Such boring actually would cut reinforcing fibers which lowers the strength of the moulded parts around the hole.

In an embodiment of the invented device, the second displacing means are preferably configured to drive the heated mechanical fastener into the joined moulded parts in a direction under a non-zero angle with the contact surfaces, and more preferably about perpendicular to the contact surfaces.

A practical embodiment relates to a device wherein the pressurizing body has a, optionally central, cavity that extends up to the pressurizing surface, and the second displacing means are configured for moving the mechanical fastener through the cavity.

The geometry of the mechanical fastener is not limited, and any geometry suitable to the purpose may be used. An improved embodiment however provides a mechanical fastener the geometry of which is configured for taking up loads out of a plane of the joined molded parts. This objective may be achieved for instance by providing the mechanical fastener in the form of a shaft and a head that protrudes laterally over some distance over the shaft. The head will during spot welding be driven into the molded part that is at the top of the assembly over some distance. This provides extra out-of-plane strength after cooling, since the head is then at least partly integrated with said molded part.

Other geometrical features may be to provide the shaft with lateral extensions, for instance as observed in a screw. Other extensions that do not form a spiral may however also be used. A The above features may also provide a mechanical fastener that is configured to be self-locking in the joined molded parts.

The device according to the invention applies pressure onto the moulded parts to be spot-welded by means of the pressurizing body. Another embodiment of the device comprises counter-pressure means at a side of the joined moulded parts opposite to the first displacing means, either passive or active.

The device as claimed in a practical embodiment is provided at an end of a robotic arm or other tool as end-effector. This allows positioning the pressurizing body accurately on the joined moulded parts in order to effectuate a plurality of spot welds.

One or more of the moulded parts are preferably manufactured from a thermoplastic material which can be welded by fusion, although it is also possible to envisage arranging a thermoplastic material or a heat meltable adhesive only on the contact surface between the moulded parts as thermal coupling means.

With the device it is possible to realize a good-quality spot welded connection between the moulded parts in a rapid and efficient manner, wherein the spot welded product has a particularly good mechanical load-bearing capacity. The moulded parts comprise a heat meltable coupling means and an induction-sensitive component. The claimed device generates an electromagnetic field in at least the contact surfaces of the moulded parts by means of the inductor of the pressurizing body; thereby heat melting the coupling means by heating the induction-sensitive component. The claimed device, comprising the features of the pressurizing body as claimed, is configured to provide a geometrically focused heated volume in the moulded parts.

In a useful embodiment, the device besides the pressurizing body, the first displacing means, the mechanical fastener and the inductor provided in the pressurizing body, further comprises shielding provided in the pressurizing body around at least a part of the inductor configured to protect against overheating.

The shielding is provided around at least a part of the inductor configured to protect against overheating. In an exemplary embodiment of the device, the pressurizing body has two side surfaces in addition to the pressurizing surface, and a top surface opposite the pressurizing surface, and the shielding is positioned between the inductor and the side surfaces.

The material of the shielding is preferably thermally insulating. Suitable materials from which the shielding may be manufactured include but are not limited to magneto-dielectric materials, and materials having metallic particles embedded in a binder, such as electrically insulated iron particles embedded in an organic binder. These materials are commercially available, for instance under the trade name Fluxtrol®.

Yet another further improved embodiment provides a device wherein the inductor comprises cooling means configured for cooling the inductor, for instance provided around the inductor in the form of sheath cooling.

In another even further improved embodiment, the device is characterized in that it comprises a heat sink provided in between the inductor and the pressurizing surface in direct contact with the inductor and the pressurizing surface. The inductor comprising cooling means configured for cooling the inductor, in an embodiment, may also be used for cooling the shielding in another embodiment, and the heat sink in yet another embodiment.

The heat sink may be provided between the inductor and the pressurizing surface and in direct contact with both. The material of the heat sink is electrically insulating yet thermally conductive, and is configured for extracting heat from the surroundings. The heat sink acts as a passive heat exchanger that transfers the heat generated in a top part of the moulded parts to the surrounding air, or to the cooling means of the inductor.

Suitable materials for the heat sink have a high thermal conductivity, but very low electrical conductivity.

A preferred embodiment of the device comprises a heat sink having a planar dimension in contact with the pressurizing surface larger than a cross-sectional dimension of the inductor. This embodiment not only improves heat transfer but also provides a more spread-out and uniform pressure on the moulded parts.

The geometry of the inductor, such as its cross-sectional shape, may in principal be chosen according to the needs. The cross-section may for instance be triangular, or circular. A useful embodiment relates to a device wherein the inductor has a quadrilateral cross-section.

The 3D shape of the inductor may also be chosen according to the needs. This may be relevant since, in some embodiments disclosed further below, the inductor not only needs to heat the moulded parts at the position of welding, but may also need to heat other parts of the device. The electromagnetic field in some embodiments therefore needs to be extended.

This may also be provided in an embodiment wherein the inductor of the pressurizing body comprises a first and a second inductor, or even a plurality of inductors.

A device may be provided wherein the inductor has a linear segment such that the inductor is configured to generate a substantially cylindrical electromagnetic field in at least the contact surfaces of the moulded parts. In this manner, the contact surface can be heated in highly selective manner, whereby a precise spot welded connection is obtained. It is also possible, and even preferred, to provide a coiled inductor, or, even more preferred, an inductor that is shaped in 3D such as to be able to heat the mechanical fastener and the surfaces to be joined together in an optimal way. This amounts to change the geometry of the inductor in accordance with the desired shape and extension of the electromagnetic field it produces. A suitable manner to manufacture a 3D shaped inductor may be by 3D printing.

The position of the inductor in the pressurizing body may also be chosen according to the needs. In a practical embodiment of the device, the inductor is positioned in the pressurizing body such that the linear segment extends substantially parallel to the pressurizing surface of the pressurizing body.

Another aspect of the invention relates to a method for electromagnetic spot welding of moulded parts. The method comprises the steps of:

A) providing a device in accordance with any one of the preceding claims;

B) moving a pressurizing surface of the pressurizing body against the moulded parts or vice versa with the first displacing means to join contact surfaces of the moulded parts to be fused by welding under pressure, wherein the moulded parts comprise a heat meltable coupling means and an induction-sensitive component;

C) generating an electromagnetic field in at least the contact surfaces of the moulded parts by means of the inductor of the pressurizing body, thereby heat melting the coupling means by heating the induction-sensitive component;

D) coupling the moulded parts under pressure by the molten heat meltable coupling means; wherein the method further comprises moving a mechanical fastener that is configured to be heated by the electromagnetic field generated by the inductor, or by other means, by second displacing means towards the moulded parts and driving the heated mechanical fastener into the joined moulded parts to a position further than the contact surfaces of the moulded parts; and E) cooling the heat meltable coupling means to solidify these means.

In the method, the moulded parts are generally provided with an electrically conductive component, for instance metal gauze, or this component is arranged between the moulded parts. Foucault currents or eddy currents are induced in the electrically conductive component by a fluctuating electromagnetic field which is generated by the inductor, preferably supplied with alternating current by a generator. Owing to the Joule effect, these Foucault currents generate the heat required to melt the heat meltable coupling means. By positioning the inductor above the position to be spot-welded, the moulded parts are mutually connected at the welded position.

The use of a substantially cylindrical electromagnetic filed in an embodiment of the method, enables a controlled, uniform and targeted heating, so that overheating in the moulded parts that need not be welded is prevented as far as possible. Overheating may result in degradation of material, and thereby cause undesirable weakening of the construction. A cylindrical electromagnetic field can moreover be made very narrow, up to a width of 10-20 mm. However, other fields may be used also, and may even be preferred.

For the purpose of heating the induction-sensitive component in the moulded parts, they must be in thermal contact with the heat meltable coupling means. This is for instance possible by mixing the induction-sensitive component and the heat meltable coupling means, such as in an injection mouldable compound.

Depending on the materials used, in particular the induction-sensitive component and the distance of the inductor from this component, a suitable power and frequency can be determined. The frequency determines inter alia the penetrative power of the electromagnetic field; the electric power of the inductor determines the strength of the fluctuating electromagnetic field and thereby the degree of heat generated in the induction-sensitive component.

It is advantageous if the heat meltable coupling means comprises a thermoplastic polymer. Thermoplastic polymers can be coupled in simple manner by fusion. Furthermore, it is easy to mix a thermoplastic polymer with an induction-sensitive component such as metal gauze or carbon fibres. Examples of particularly suitable thermoplastic polymers are polypropylene, polyamide, polyether imide, polyether ether ketone and polyphenylene sulphide, although the method is in principle suitable for any thermoplastic.

The component heatable by induction preferably comprises carbon fibres and/or a metal. These materials can be readily heated by induction and also have, in addition to electrical conduction, a good thermal conduction, whereby the generated heat is well distributed. Carbon fibres incorporated in a thermoplastic polymer are recommended because the carbon fibres also improve the material strength.

In another preferred embodiment of the method the component heatable by induction comprises ferromagnetic particles. Suitable particles are for instance described in WO0185827 and have the additional advantage that, when they reach the so-called Curie temperature thereof, they lose their magnetic dipoles, whereby they do not heat any further. This can form a protection against overheating.

The Foucault currents or eddy currents induced in the contact surface are bounded by the geometry of the moulded parts. Edges, corners and holes in the moulded parts influence the distribution of Foucault currents and therefore also influence the heat developed. Such disruptions of the field may result in heating of components which do not have to be heated for the welding process. Conversely, it is also possible that some parts are difficult to heat. These problems can be solved by repositioning the boundaries of the area where Foucault currents may begin to occur at determined locations of the thermoplastic moulded parts. With this preferred embodiment, parts that were formerly difficult to heat can nevertheless be heated and high temperatures at undesired locations can be prevented.

The invention further comprises moving a mechanical fastener that is configured to be heated by the electromagnetic field generated by the inductor, or by other means, by second displacing means towards the moulded parts and driving the heated mechanical fastener into the joined moulded parts to a position further than the contact surfaces of the moulded parts.

Preferably, the heated mechanical fastener is driven into the joined moulded parts by the second displacing means in a direction under a non-zero angle with the contact surfaces, preferably about perpendicular to the contact surfaces.

In a practical embodiment, the pressurizing body has a cavity that extends up to the pressurizing surface, and the second displacing means move the mechanical fastener through the cavity. The cavity may be positioned in a random position but is preferably positioned about centrally in the pressurizing body.

A pressure may be applied at a side of the joined moulded parts opposite to the first displacing means by counter-pressure means.

For application in the method as claimed in the invention, the inductor is connected to an alternating current generator, wherein the alternating current generator is electrically connected to the electrical connecting means of the inductor. Usable frequencies lie generally between 0.1-10 MHz. A frequency between 0.1 and 0.5 MHz is preferably used, and more preferably a frequency between 0.15 and 0.4 MHz. At such a preferred frequency an optimal balance is achieved between penetrative power of the electromagnetic field and rate of heating.

The inductor preferably has a plurality of windings. Such an inductor may be embodied compactly and preferably may be provided with flat side surfaces. It may be suitable for precisely determined induction.

It is advantageous if the inductor is substantially flat. This is possible for instance by embodying the inductor as an electrical conductor lying in one plane. Such a flat inductor is exceptionally compact and suitable for applying an electromagnetic field at a determined position in very precise and uniform manner.

In a further preferred embodiment the inductor is provided with at least one feed channel adapted for passage of a cooling medium, such as in sheath cooling. The temperature of the inductor can hereby be held constant during use, this also being favourable for the electrical resistance of the inductor. The cooling medium is preferably a liquid such as water, with a high heat capacity. The induction part can for instance be a metal tube bent into the desired form, through which the cooling medium is pumped while an electromagnetic field is caused through the metal of the tube itself with an alternating voltage.

Other preferred embodiments of the method relate to further comprising the step E) of cooling the inductor. This step solidifies the mechanical fastener into the cooled down and also solidified moulded parts.

Preferably also, heat is transferred away from a top part of the moulded parts by a heat sink provided in the pressurizing body. Even more preferred is a method wherein heat is prevented from spreading to other parts than the heated mechanical fastener of the device by shielding provided in the pressurizing body.

Other preferred embodiments relate to methods wherein the heat sink is cooled, and/or wherein the shielding is cooled. This is conveniently carried out by cooling the inductor, preferably by sheath cooling.

BRIEF DESCRIPTION OF THE FIGURES

The invention will now be elucidated with reference to the following figures, without however being limited thereto. In the figures.

DESCRIPTION OF EXEMPLARY EMBODIMENTS

Figure 1:
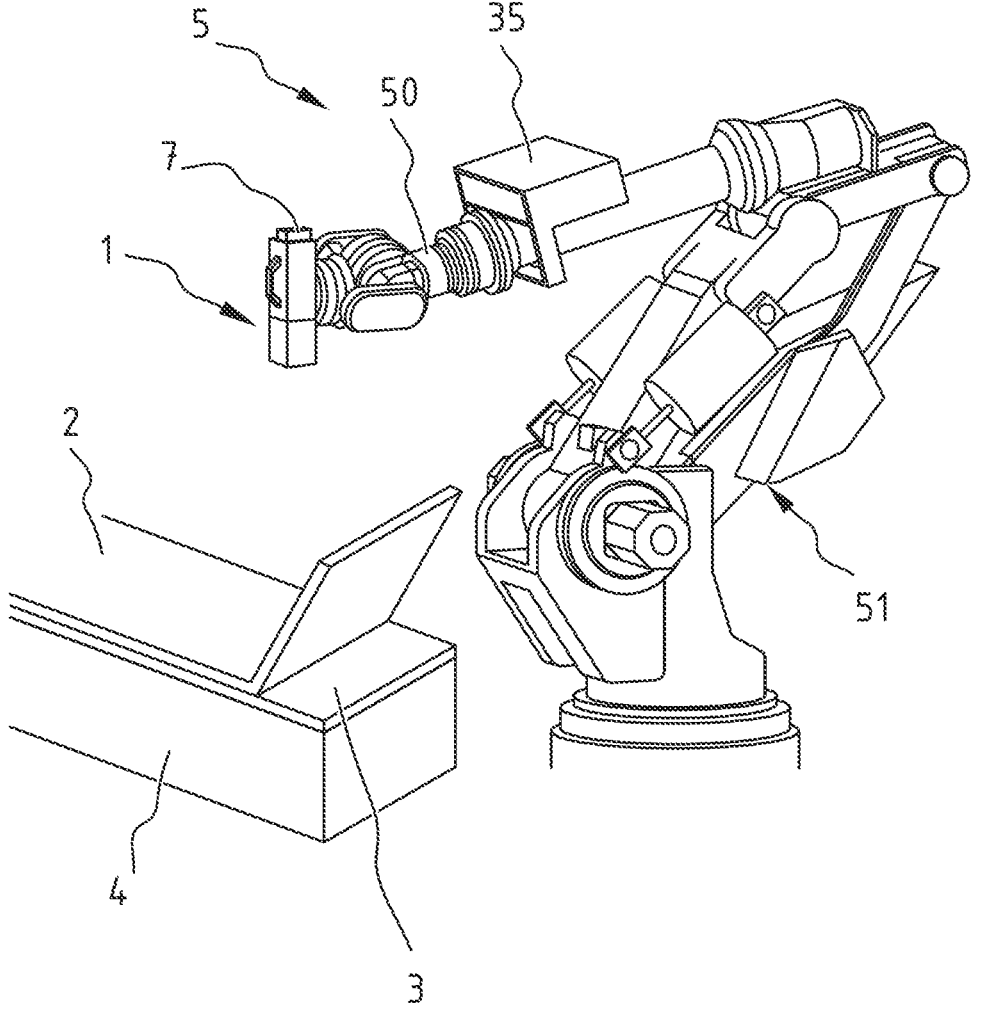
FIG. 1 schematically shows a welding system provided with a device in accordance with an embodiment of the invention as end-effector.

FIG. 1 shows a spot welding system 5 provided with a device 1 in accordance with an embodiment of the invention.

The device 1 acts as end-effector of a robotic arm 50 that is part of an industrial six-axis robot 51. It should be noted that the robotic arm 50 is not essential to the invention and that other displacing means for the device 1 may be envisaged, such as a static actuator. The robot 51 is programmed to move first displacing means in the form of the robotic arm 50 and the end-effector device 1 towards an assembly of moulded parts (2, 3) to be spot welded to a plurality of discrete positions where a spot weld has to be made. An inductor 11 that is incorporated in a pressurizing body 10 of the device 1 (see FIG. 2) is in operation connected to an alternating current generator 52 arranged on the robot 51 for the purpose of generating an electromagnetic field. The alternating current generator 52 may however be positioned elsewhere, and may even be incorporated in the pressurizing body 10 of the device 1. In the embodiment shown, counter-pressure means 4 are provided at a side of the joined moulded parts (2, 3) opposite to the side where the first displacing means or robotic arm 50 is approaching the assembly (2, 3). The counter-pressure means 4 may be embodied as a solid body or may be active in the sense that it can be pressed against said side of the joined moulded parts (2, 3).

Figure 2:
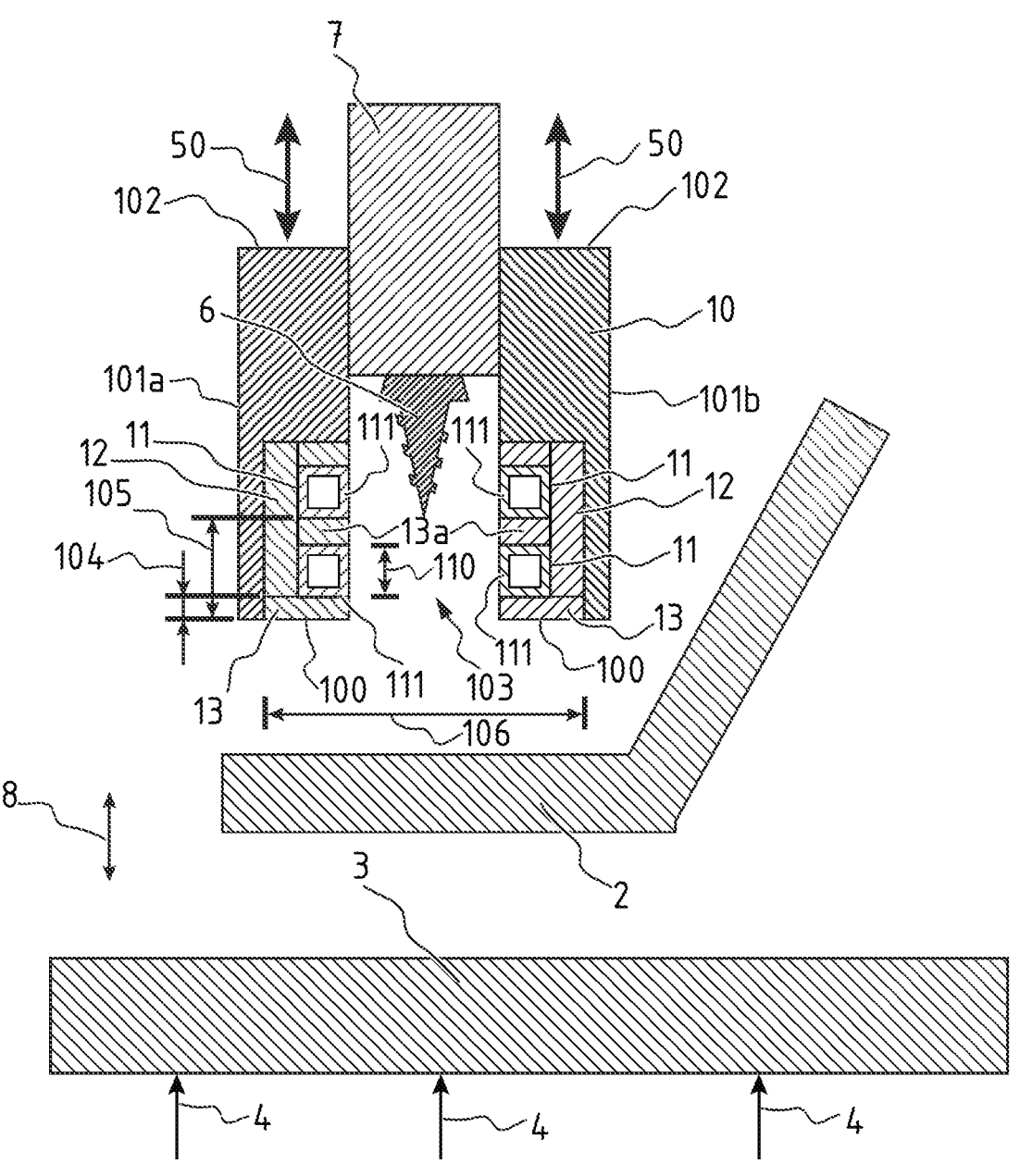
FIG. 2 schematically shows a cross-sectional view of a device in accordance with an embodiment of the invention.

As shown in more detail in FIG. 2, a device 1 for electromagnetic spot welding of moulded parts (2, 3) comprises the pressurizing body 10 and first displacing means, for instance in the form of robotic arm 50 (schematically represented by the arrows 50 in FIG. 2). The pressurizing body 10 may be a solid block of metal, such as iron, or may be embodied otherwise, as long as it may exert pressure on a substrate. The pressurizing body 10 of FIG. 2 has two side surfaces (101a, 101b) in addition to the pressurizing surface 100, and a top surface 102 opposite the pressurizing surface 100. As shown, the pressurizing body 10 further has a central cavity 103 in certain embodiments, described further below, but the central cavity is not an essential feature for the invention. Please note that FIG. 2 represents a cross-sectional view though a vertical mid-plane of the device 1. Although the cavity 103 may appear open at a front side, it will in embodiments be enclosed by the pressurizing body 10 material, such as in a central cylindrical cavity provided in a solid block for instance.

Figure 3:
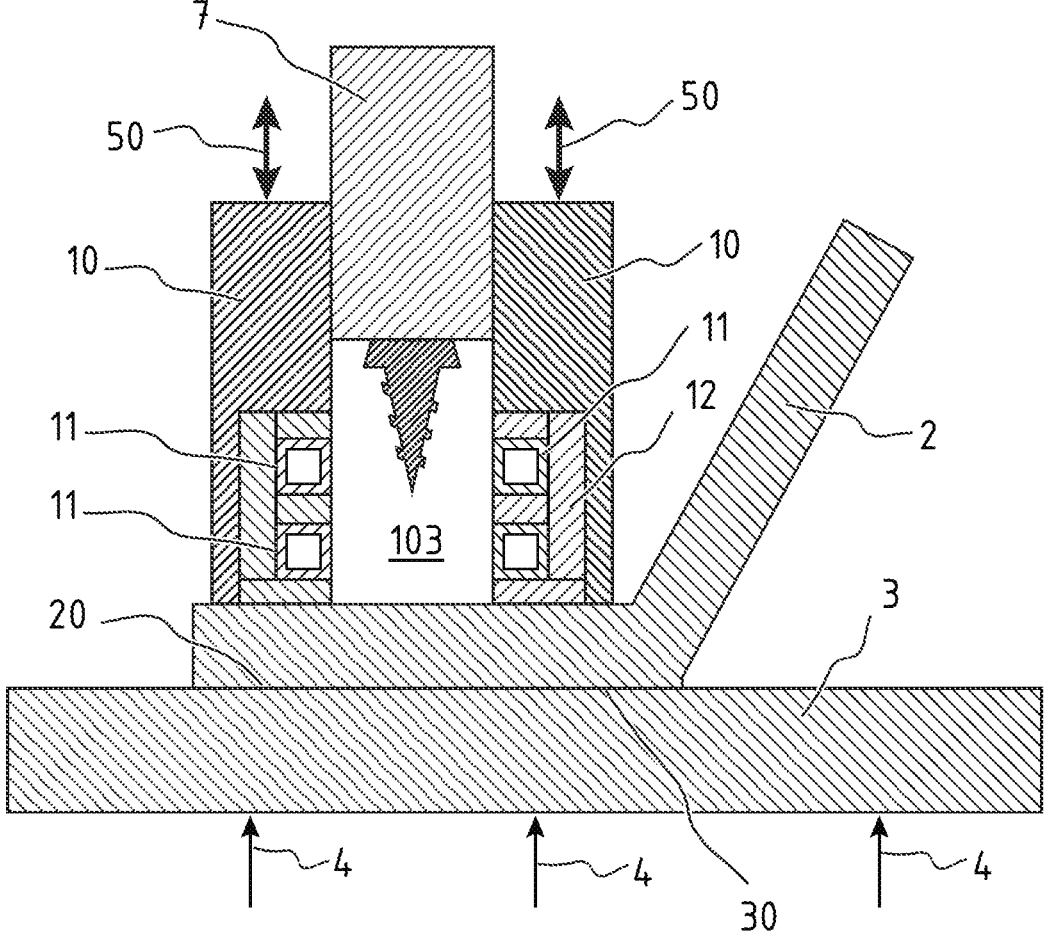
FIG. 3 schematically shows a cross-sectional view of the device of FIG. 1 in another step of a method in accordance with an embodiment of the invention.

The robotic arm 50 is programmed to move a pressurizing surface 100 of the pressurizing body 10 against the moulded parts (2, 3) or vice versa. As shown in FIG. 3, contact surfaces (20, 30) of the moulded parts (2, 3) to be fused by welding are then joined (but not yet welded) under pressure.

According to FIG. 2, the pressurizing body 10 further comprises the inductor 11 provided in the pressurizing body 10. The inductor 11 is configured to generate an electromagnetic field 12 in at least the contact surfaces (20, 30) of the moulded parts (2, 3). In the embodiment shown, the inductor 11 has a quadrilateral cross-section, and further is provided with a linear segment such that the inductor is configured to generate a substantially cylindrical electromagnetic field in at least the contact surfaces (20, 30) of the moulded parts (2, 3). In this way, the electromagnetic filed may be concentrated to not extend much further than the position to be welded. The linear segment(s) in FIG. 2 extend substantially parallel to the pressurizing surface 100 of the pressurizing body 10 at some distance 104 from the pressurizing body 10. Another segment may be positioned at a larger distance 105 from the pressurizing surface 100. This other segment may be part of the same inductor 11, or may be part of a second inductor 11 provided in the pressurizing body 10 at a greater height.

A shielding 12 is also provided in the pressurizing body 10 around at least a part of the inductor 11. The shielding is configured to protect against overheating, and is thereto made from a suitable heat isolating material, such as Flux-trol®. The shielding 12 comprises a plate like structure and is positioned between the inductor 11 and the side surfaces (101a, 101b) of the pressurizing body 10.

The invented device 10 further comprises a heat sink 13 that is incorporated in the pressurizing body 10 and is provided in between the inductor 11 and the pressurizing surface 100. The heat sink 13 moreover is positioned such that it is in direct contact with (a lower surface of) the inductor 11 and the pressurizing surface 100. Additional heat sink material 13a may also be provided between inductor parts 11, if appropriate. The heat sink 13 may be embodied as a plate like structure that moreover, may have a planar dimension 106 in contact with the pressurizing surface 100 that is larger than a cross-sectional dimension 110 of the inductor 11. The heat sink 13 is preferably made from a ceramic material.

As also shown, the inductor 11 is provided with sheath cooling 111, for instance embodied by a conduit through which a cooling liquid like water is running. The sheath cooling not only cools the inductor 11, but is also adapted to cool the shielding 12 and the heat sink 13, at least partly.

Figure 6:
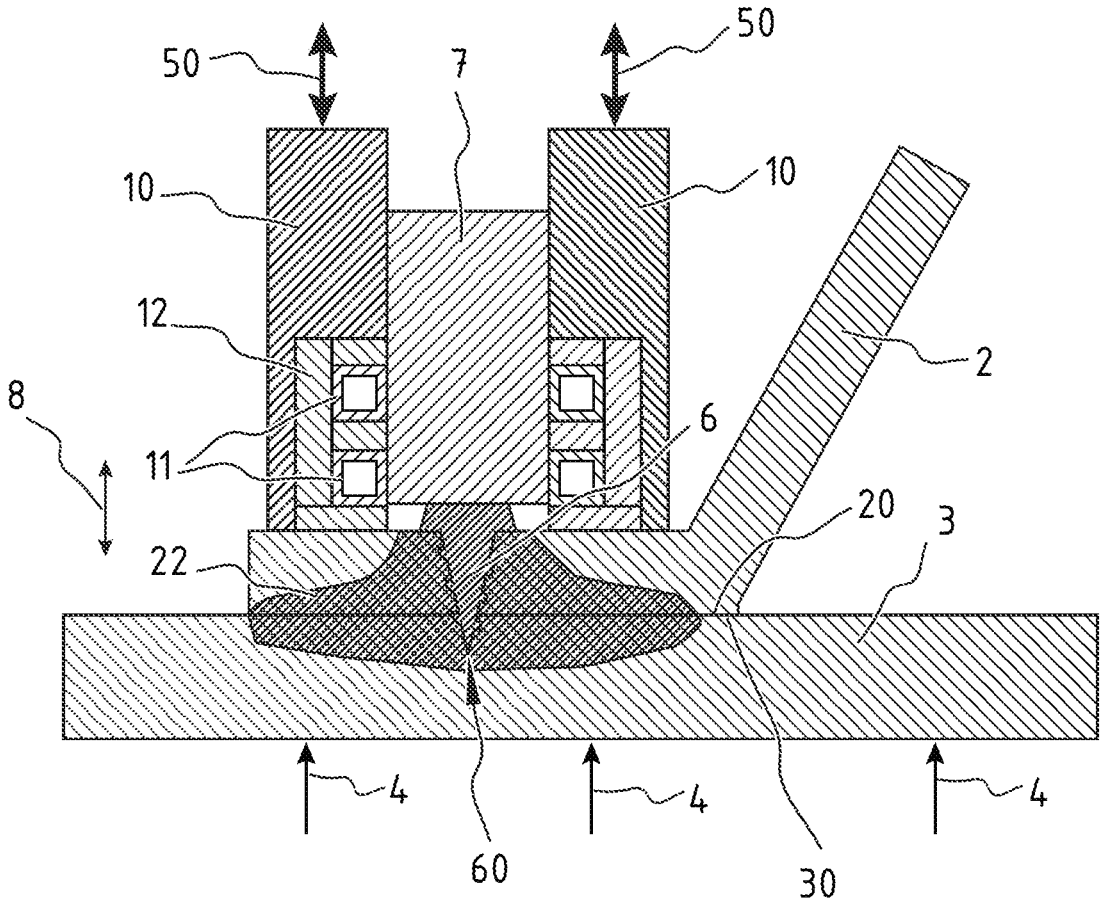
FIG. 6 schematically shows a cross-sectional view of the device of FIG. 1 in yet another step of a method in accordance with an embodiment of the invention.

The embodiment shown in the figures further comprises a mechanical fastener in the form of a ribbed rivet 6 that is configured to be heated by the electromagnetic field generated by the inductor 11, or by other means, such as a separate thermal, IR, . . . heater (not shown). The device 1 in this embodiment is also equipped with second displacing means in the form of a plunger 7, configured—as shown in FIGS. 5 to 8—for moving the rivet 6 towards the moulded parts (2, 3) and drive the heated rivet 6 into the joined moulded parts (2 3) about perpendicular to the contact surfaces (20, 30) to a position further than the contact surfaces (20, 30) of the moulded parts (2, 3), as shown in FIG. 6. As a result, the rivet 6 is welded into the joined and welded moulded parts (2, 3). This provides a spot welded connection between the moulded parts (2, 3) that is reinforced mechanically by the rivet 6, in particular in an out-of-plane direction 8. In this embodiment, the pressurizing body 10 is provided with the optionally central cavity 103 that extends up to the pressurizing surface 100 of the pressurizing body 10. The second displacing means or plunger 7 is then configured for moving the rivet 6 through the cavity 103.

With reference to FIGS. 2-8, a number of method steps are shown for electromagnetic spot welding of the moulded parts (2, 3) using the invented device 1.

In an initial step (FIG. 2), a device 1 is provided in proximity to a first moulded part 2 and a second moulded part 3 that need to be spot welded. The moulded parts (2, 3) are as yet separated from each other.

In a subsequent step, the pressurizing surface 100 of the pressurizing body 10 is moved against the moulded parts (2, 3) or vice versa with the robotic arm 50 such that contact surfaces (20, 30) of the moulded parts (2, 3) to be fused by spot welding are brought together or joined (but not welded) under pressure. The moulded parts (2, 3) comprise a heat meltable coupling means and an induction-sensitive component to heat them up under the influence of an electromagnetic field, produced by the inductor 11. Thereto, the moulded parts (2, 3) may be manufactured from a thermoplastic polymer reinforced with carbon fibres, wherein the carbon fibres may serve as induction-sensitive component, whereas the thermoplastic polymer may serve as heat meltable coupling means. The moulded parts (2, 3) can for instance comprise carbon fibre-reinforced polyphenylene sulphide, for instance with a material thickness of 1-3 mm. The first moulded part 2 has a folded edge, and may for instance represent a stiffener, while the second moulded part 3 is a flat plate. Obviously, both moulded parts (2, 3) may have another shape, such as being curved.

Figure 4:
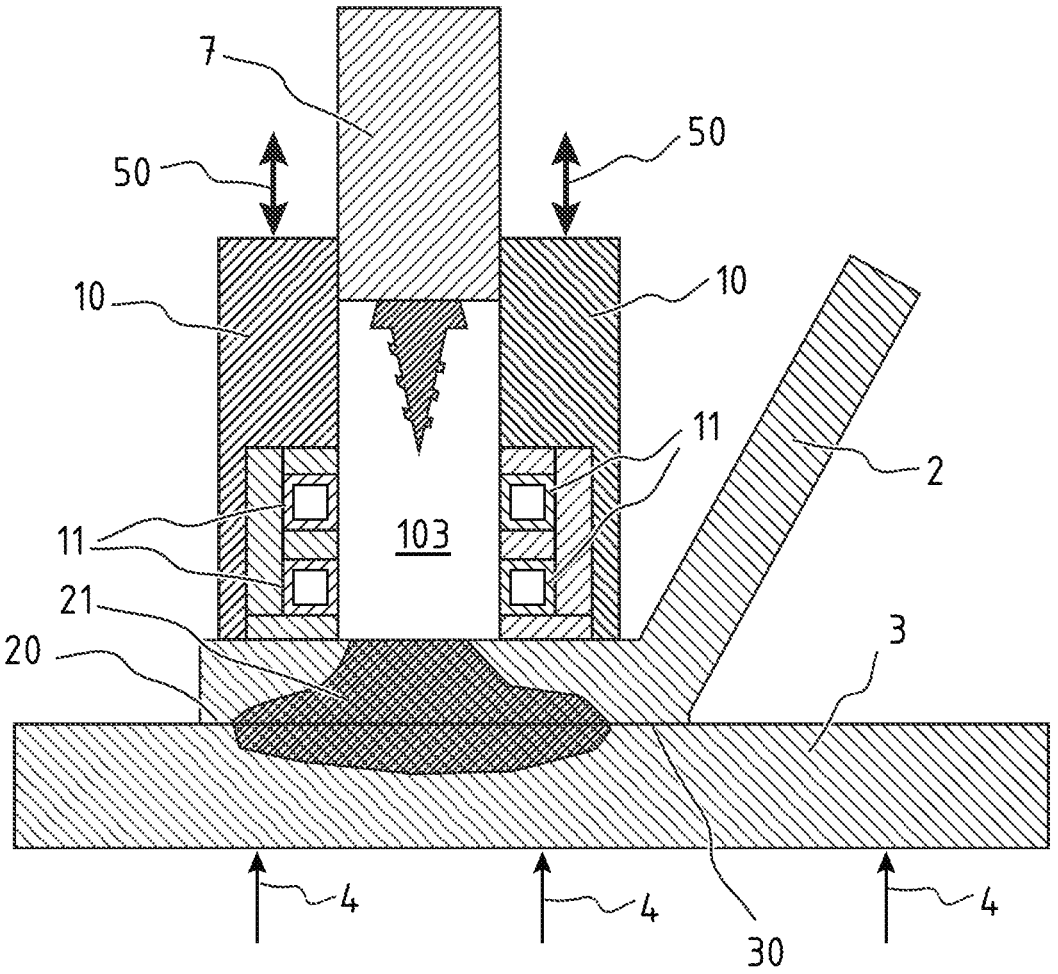
FIG. 4 schematically shows a cross-sectional view of the device of FIG. 1 in yet another step of a method in accordance with an embodiment of the invention.
Figure 5:
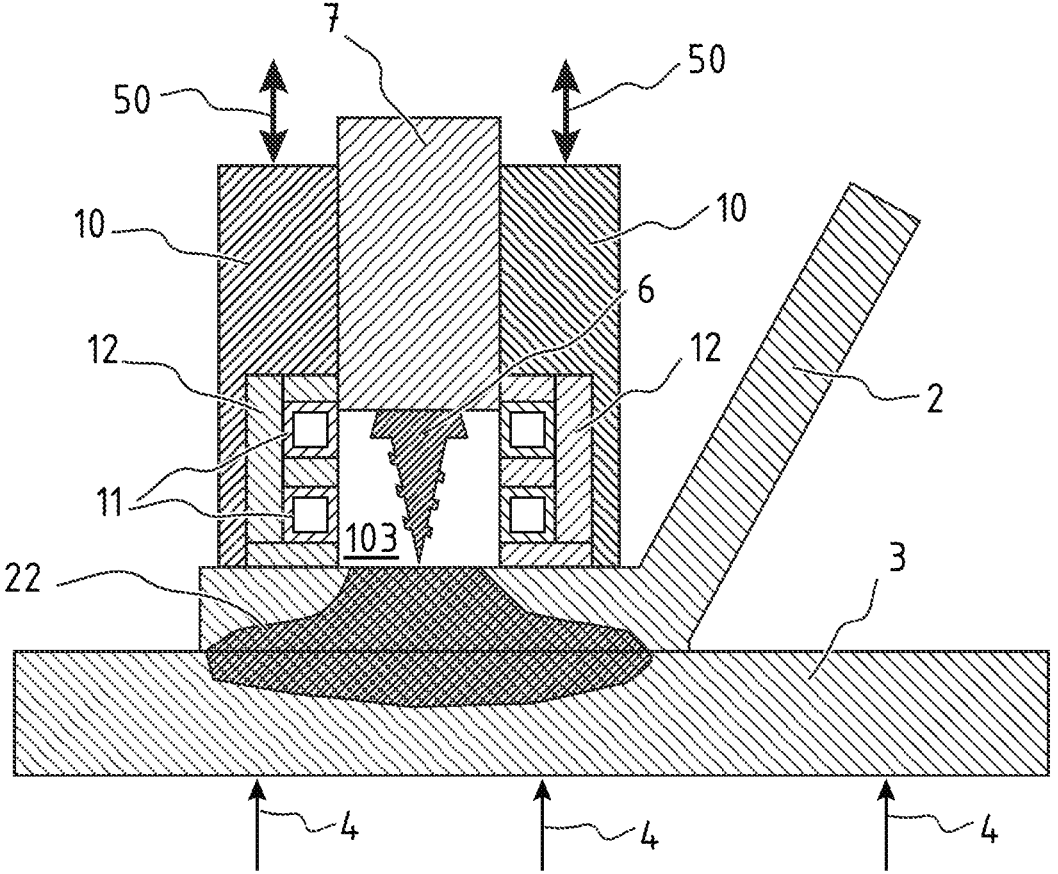
FIG. 5 schematically shows a cross-sectional view of the device of FIG. 1 in yet another step of a method in accordance with an embodiment of the invention.

Referring to FIG. 4, another step comprises generating an electromagnetic field in at least the contact surfaces (20, 30) of the moulded parts (2, 3) with the inductor 11 of the pressurizing body 10, while at the same time cooling the inductor 11 with the sheath cooling 111. This heats (and possibly melts) the thermoplastic polymer of the moulded parts (2, 3) in a volume 21 of both moulded parts (2, 3) by heating the carbon fibers in the moulded parts (2, 3). The temperature in volume 21 may not be uniform throughout, and a central part of the volume 21 only may have a temperature that exceeds the melting temperature of the thermoplastic polymer. To limit the volume 21 to where it is needed (around the spot to be welded) a cylindrical electromagnetic field is preferred. Such a field may be induced by an inductor 11 having linear segment(s). The specific configuration of the pressurizing body 10 that comprises shielding 12, the heat sink 13, and the sheath cooling 111 provides a controlled and well focused volume 21. The heating of the moulded parts (2, 3) in the joined configuration to a temperature which is high enough to heat melt the thermoplastic polymer (or optionally a heat meltable adhesive applied to contact surfaces 20, 30) fuses the two moulded parts (2, 3) together at least in a volume around the spot to be welded. During the heating and/or optionally a short time thereafter, the contact surfaces (20, 20) are preferably pressed together by the pressurizing body 10 itself, and by counter-pressure means 4, so as to thus bring about a connection between the moulded parts (2, 3). This connection has a particularly high mechanical load-bearing capacity. The pressuring body 10 is then removed from the spot welded moulded parts (2, 3) by the robotic arm 50.

The above procedure may be repeated for another position where a spot weld needs to be made. The pressuring means 10 are moved to this other position and the sequence of events shown in FIGS. 2-4 is repeated.

As shown in FIGS. 5-8, a mechanical fastener, such as a rivet 6, is during welding provided into the joined moulded parts (2, 3) that were joined in the step shown in FIG. 3. The mechanical fastener may be driven into the moulded parts after they were joined, but may also be driven into the molded parts before joining. After inducing an electromagnetic field by the inductor 11, in accordance with the step as shown in FIG. 4, the rivet 6 is heated by the electromagnetic field generated by the inductor 11 as well, or by other means such as separate heating.

In a next step, the heated rivet 6 is moved by the plunger 7 towards the joined moulded parts (2, 3) that are heated by the electromagnetic field generated by the inductor 11 over a volume 22. This volume 22 may be a bit larger than volume 21, for instance because the rivet 6 is also heated. The plunger 7 moves along the cavity 103 that extends up to the pressurizing surface 100 of the pressurizing body 10, and thereby moves the heated rivet 6 through the cavity 103.

Referring to FIG. 6, the heated rivet 6 is then driven by the robotic arm 50 into the joined and heated moulded parts (2, 3) in a direction 8 about perpendicular to the contact surfaces (20, 30), to a position 60 that is further below than the position of the contact surfaces (20, 30) of the moulded parts (2, 3). In this process, the rivet 6 may move any carbon fibers to the side which in fact strengthens the connection made. Since the thermoplastic polymer of the moulded parts (2, 3)

is heated, and in a core part is heated above its melting temperature, driving in the heated rivet 6 is facilitated.

Figure 7:
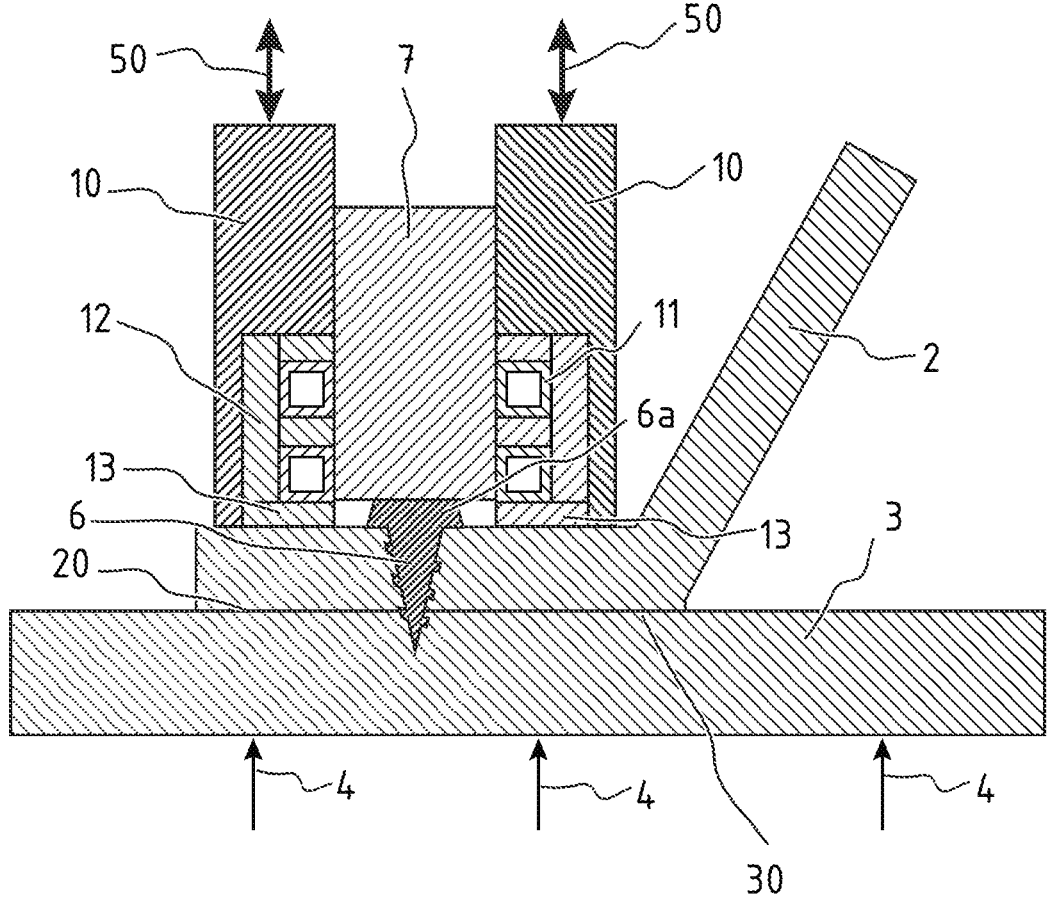
FIG. 7 schematically shows a cross-sectional view of the device of FIG. 1 in yet another step of a method in accordance with an embodiment of the invention.
Figure 8:
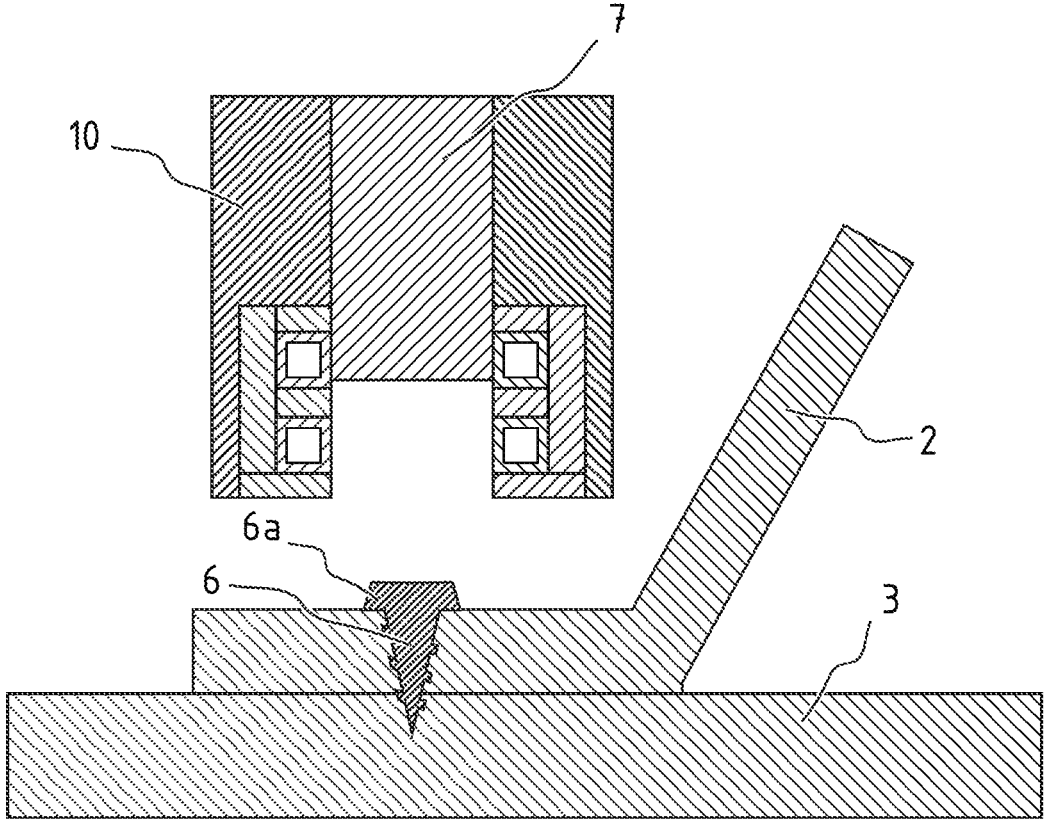
FIG. 8 schematically shows a cross-sectional view of the device of FIG. 1 in yet another step of a method in accordance with an embodiment of the invention.

Referring to FIG. 7, the inductor 11 is disconnected from the alternating current generator 52 such that the electromagnetic field is deactivated. This will cool down the heated volume 22 while still applying pressure. Cooling down solidifies the thermoplastic polymer and geometrically locks the rivet 6 in the spot welded moulded parts (2, 3). A head section 6a of the rivet 6 extends laterally to prevent the rivet 6 from being driven into the moulded parts (2, 3) too far. Together with the spiraled shaft, the head section 6a further provides an improved out-of-plane strength of the produced spot weld.

In a final step, after cooling down, the pressuring body 10 is removed from the spot welded and mechanically riveted moulded parts (2, 3) with the robotic arm 50.

The above procedure may be repeated for another position where a riveted spot weld needs to be made. The pressuring means 10 are moved to this other position and the sequence of events shown in FIGS. 2-8 is repeated.

The invention claimed is:

1. A device for electromagnetic spot welding of moulded parts, wherein the moulded parts comprise an induction-sensitive component incorporated in a heat meltable coupling means, said device comprising:
   a pressurizing body; and
   first displacing means configured for moving a pressurizing surface of the pressurizing body against the moulded parts or vice versa to join contact surfaces of the moulded parts to be fused by welding under pressure;
   wherein the pressurizing body further comprises:
   an inductor provided in the pressurizing body and configured to generate an electromagnetic field in at least the contact surfaces of the moulded parts thereby heat melting the coupling means by heating the induction-sensitive component;
   a heat sink provided in between the inductor and the pressurizing surface in direct contact with the inductor and the pressurizing surface, wherein additional heat sink material is disposed between parts of the inductor, and
   a mechanical fastener that is configured to be heated by the electromagnetic field generated by the inductor, and second displacing means configured for moving the heated mechanical fastener towards the heated moulded parts and drive the heated mechanical fastener into the joined heated moulded parts to a position further than the contact surfaces of the heated moulded parts, such that reinforcing fibers in the heated moulded parts are deviated and formed around a cavity produced by the mechanical fastener.

2. The device of claim 1, wherein the inductor comprises cooling means configured for cooling the inductor.

3. The device of claim 2, wherein the cooling means comprise sheath cooling provided around the inductor.

4. The device of claim 2, further comprising shielding provided in the pressurizing body around at least a part of the inductor configured to protect against overheating and a heat sink provided in between the inductor and the pressurizing surface in direct contact with the inductor and the pressurizing surface, wherein the heat sink has a planar dimension in contact with the pressurizing surface larger than a cross-sectional dimension of the inductor, and wherein the cooling means are also configured for cooling the shielding and the heat sink.

5. The device of claim 2, further comprising:
   shielding provided in the pressurizing body around at least a part of the inductor configured to protect against overheating and a heat sink provided in between the inductor and the pressurizing surface in direct contact with the inductor and the pressurizing surface, wherein the heat sink has a planar dimension in contact with the pressurizing surface larger than a cross-sectional dimension of the inductor, and wherein the cooling means are also configured for cooling the shielding and the heat sink;
   wherein the pressurizing body has two side surfaces in addition to the pressurizing surface, and a top surface opposite the pressurizing surface, and the shielding is positioned between the inductor and the side surfaces;
   wherein the heat sink is made from a ceramic material; and
   wherein the shielding is made from a ferro-magnetic shielding material.

6. The device of claim 1, further comprising shielding provided in the pressurizing body around at least a part of the inductor configured to protect against overheating.

7. The device of claim 6, wherein the pressurizing body has two side surfaces in addition to the pressurizing surface, and a top surface opposite the pressurizing surface, and the shielding is positioned between the inductor and the side surfaces.

8. The device of claim 1, wherein the second displacing means are configured to drive the heated mechanical fastener into the joined moulded parts in a direction under a non-zero angle with the contact surfaces, preferably about perpendicular to the contact surfaces.

9. The device of claim 1, wherein the pressurizing body has a, optionally central, cavity that extends up to the pressurizing surface, and the second displacing means are configured for moving the mechanical fastener through the cavity.

10. The device of claim 1, wherein the inductor has a quadrilateral cross-section.

11. The device of claim 1, wherein the parts of the inductor comprise a first inductor and a second inductor and the additional heat sink material is disposed between the first inductor and the second inductor.

12. The device of claim 1, wherein the heat sink has a planar dimension in contact with the pressurizing surface larger than a cross-sectional dimension of the inductor.

13. The device of claim 1, wherein the heat sink is made from a ceramic material.

14. The device of claim 1, further comprising counter-pressure means at a side of the joined moulded parts opposite to the first displacing means.

15. The device of claim 1, further comprising an alternating current generator connected to the inductor.

16. The device of claim 1, provided at an end of a robotic arm or other tool as end-effector.

17. A method for electromagnetic spot welding of moulded parts comprising an induction-sensitive component incorporated in a heat meltable coupling means, said method comprising the steps of:
   A) providing a device in accordance with claim 1;
   B) moving a pressurizing surface of the pressurizing body against the moulded parts or vice versa with the first displacing means to join contact surfaces of the moulded parts to be fused by welding under pressure;
   C) generating an electromagnetic field in at least the contact surfaces of the moulded parts by means of the inductor of the pressurizing body, thereby heat melting the coupling means by heating the induction-sensitive component;

D) coupling the moulded parts under pressure by the molten heat meltable coupling means; wherein the method further comprises heating a mechanical fastener that is configured to be heated by the electromagnetic field generated by the inductor, or by other means, and moving the heated mechanical fastener by second displacing means towards the heated moulded parts and driving the heated mechanical fastener into the joined heated moulded parts to a position further than the contact surfaces of the heated moulded parts, such that reinforcing fibers in the heated moulded parts are deviated and formed around a cavity produced by the mechanical fastener; and E) cooling the heat meltable coupling means to solidify these means.

\* \* \* \* \*